(12) United States Patent
Yamamoto et al.

(10) Patent No.: US 8,276,938 B2
(45) Date of Patent: Oct. 2, 2012

(54) CURTAIN BAG

(75) Inventors: Toshiharu Yamamoto, Tokyo (JP); Masakazu Kudo, Tokyo (JP); Yoshinori Kami, Matsuura (JP); Tokio Okuno, Matsuura (JP)

(73) Assignees: Asahi Kasei Engineering Corporation, Osaka (JP); Sumisho Airbag Systems Co., Ltd., Nagasaki (JP)

( * ) Notice: Subject to any disclaimer, the term of this patent is extended or adjusted under 35 U.S.C. 154(b) by 314 days.

(21) Appl. No.: 12/664,636

(22) PCT Filed: Jul. 4, 2008

(86) PCT No.: PCT/JP2008/062138
§ 371 (c)(1),
(2), (4) Date: Dec. 14, 2009

(87) PCT Pub. No.: WO2009/008350
PCT Pub. Date: Jan. 15, 2009

(65) Prior Publication Data
US 2010/0171293 A1    Jul. 8, 2010

(30) Foreign Application Priority Data

| Jul. 11, 2007 | (JP) | 2007-181838 |
| Oct. 1, 2007 | (JP) | 2007-257060 |
| Dec. 13, 2007 | (JP) | 2007-322147 |
| Jan. 31, 2008 | (JP) | 2008-020076 |

(51) Int. Cl.
*B60R 21/213* (2006.01)
*B60R 21/16* (2006.01)

(52) U.S. Cl. ................. 280/730.2; 280/743.1

(58) Field of Classification Search ............... 280/743.1, 280/730.2
See application file for complete search history.

(56) References Cited

U.S. PATENT DOCUMENTS

| 6,073,961 | A | 6/2000 | Bailey et al. | |
| 6,220,625 | B1 * | 4/2001 | Wallner et al. | 280/730.2 |
| 6,283,507 | B1 * | 9/2001 | Kami et al. | 280/743.1 |
| 6,431,589 | B1 * | 8/2002 | Heigl et al. | 280/730.2 |
| 6,431,590 | B1 * | 8/2002 | Bakhsh et al. | 280/730.2 |
| 6,471,240 | B2 * | 10/2002 | Bakhsh et al. | 280/729 |
| 6,527,296 | B2 * | 3/2003 | Bakhsh et al. | 280/730.2 |
| 6,616,178 | B1 * | 9/2003 | Nanbu | 280/730.2 |
| 7,267,364 | B2 * | 9/2007 | Noguchi et al. | 280/730.2 |

(Continued)

FOREIGN PATENT DOCUMENTS

CN    1796188 A    7/2006

(Continued)

OTHER PUBLICATIONS

Chinese Office Action dated Jul. 7, 2011 for Chinese Application No. 200880024077.5.

(Continued)

*Primary Examiner* — Ruth Ilan
(74) *Attorney, Agent, or Firm* — Birch, Stewart, Kolasch & Birch, LLP (57) ABSTRACT

Provided is a curtain bag which can be brought into an inflated state as required in a short time without locally applying an excessive load to its outer peripheral joint part (1) and inner joint parts (2). The dot-like inner joint parts (2) on the inside of the outer peripheral joint part (1) are isolated from the outer peripheral joint part (1) and also made to be independent of each other.

15 Claims, 9 Drawing Sheets

U.S. PATENT DOCUMENTS

| | | |
|---|---|---|
| 7,556,288 B2 | 7/2009 | Zauritz et al. |
| 2001/0026062 A1* | 10/2001 | Kosugi et al. ............. 280/730.2 |
| 2002/0020992 A1 | 2/2002 | Kanuma |
| 2002/0163167 A1* | 11/2002 | Hill ............................ 280/730.2 |
| 2003/0132620 A1* | 7/2003 | Kawasaki et al. .......... 280/730.2 |
| 2003/0230878 A1* | 12/2003 | Inoue ......................... 280/730.2 |
| 2004/0075257 A1 | 4/2004 | Ogawa et al. |
| 2005/0006880 A1 | 1/2005 | Nakayama |
| 2005/0134022 A1 | 6/2005 | Noguchi et al. |
| 2005/0161917 A1 | 7/2005 | Stevens |
| 2006/0292950 A1* | 12/2006 | Hill ................................. 442/76 |
| 2008/0012274 A1* | 1/2008 | Zauritz et al. ................. 280/729 |

FOREIGN PATENT DOCUMENTS

| | | |
|---|---|---|
| JP | 02-237837 A | 9/1990 |
| JP | 2000-52911 A | 2/2000 |
| JP | 2001-315610 A | 11/2001 |
| JP | 2002-503581 A | 2/2002 |
| JP | 2002-145001 A | 5/2002 |
| JP | 2002-225660 A | 8/2002 |
| JP | 2003-72504 A | 3/2003 |
| JP | 2004-203234 A | 7/2004 |
| JP | 2005-29102 A | 2/2005 |
| JP | 2005-178612 A | 7/2005 |
| JP | 2007-55606 A | 3/2007 |
| WO | WO 98/07598 A1 | 2/1998 |
| WO | WO-99/42333 A1 | 8/1999 |
| WO | WO-01/45988 A1 | 6/2001 |
| WO | WO-2005/058643 A2 | 6/2005 |
| WO | WO 2006/084633 A1 | 8/2006 |

OTHER PUBLICATIONS

European Search Report for European Application No. 08790869.5, mailed Nov. 28, 2011.

Office Action for European Application No. 08790869.5, mailed Dec. 29, 2011.

* cited by examiner

(a) MAT WEAVE (b) FIGURED DOUBLE WEAVE (c) PLAIN WEAVE

PRIOR ART

FIG.20

PRIOR ART

FIG.21

PRIOR ART

FIG.22

PRIOR ART

CURTAIN BAG

CROSS-REFERENCE TO RELATED APPLICATIONS

This application is a National Phase application of PCT/JP2008/062138 filed on Jul. 4, 2008, which claims the benefit under 35 U.S.C. §119(a) to Japanese Patent Application Nos. 2007-181838; 2007-257060; 2007-322147 and 2008-020076 all filed in Japan, on Jul. 11, 2007; Oct. 1, 2007; Dec. 13, 2007 and Jan. 31, 2008, respectively. The entire contents of all of the above applications are hereby incorporated by reference.

TECHNICAL FIELD

The present invention relates to a curtain bag (also, called an inflatable curtain or a curtain air bag), which bag is caused to inflate between a side window of an automobile and a passenger to absorb a shock on a passenger's head in order to protect a passenger's head mainly when a side of an automobile collides against another automobile or an obstacle.

BACKGROUND ART

Most passenger cars presently produced are provided with a so-called driver seat air bag and an assistant driver seat air bag, each of which is caused to rapidly inflate between a passenger and a cab structure in an automobile when the front face of the automobile collides (head-on collision) against another automobile or an obstacle.

In recent years, in order to protect a passenger's head not only in head-on collision but also when a side of an automobile collides (lateral collision) against another automobile or an obstacle, a curtain bag system begins to be really mounted, in which system a curtain bag folded and stored in a ceiling part above a side window of an automobile or a pillar part develops and inflates in a manner to cover a side window portion in a collision.

Figure 19:
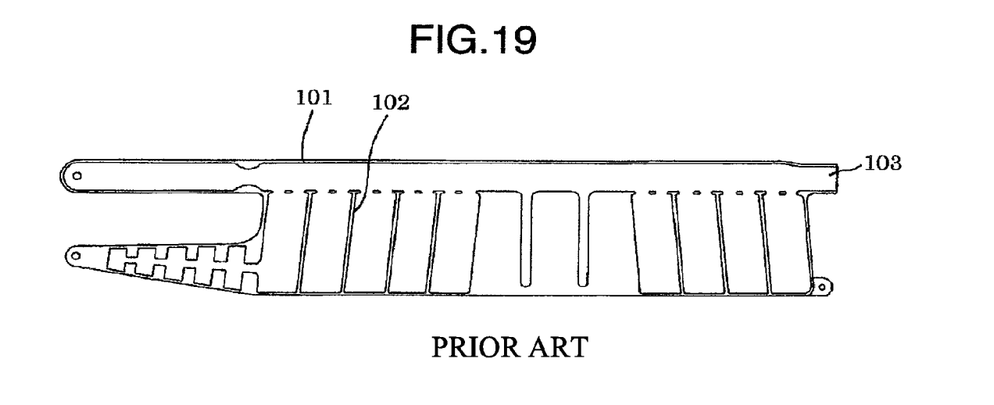
FIG. 19 A schematic view showing a conventional curtain bag described in U.S. Pat. No. 6,010,149.

Conventionally, a curtain bag shown in Patent Document 1 is known as an example of a curtain bag. As shown in FIG. 19, the curtain bag shown in the Patent Document 1 comprises two pieces of cloth provided with a coating and joined at an outer peripheral joint part 101 provided at outer peripheral edges thereof to define an outer peripheral shape of a bag, and at an inner peripheral joint part 102 provided inwardly of the outer peripheral joint part 101. The inner peripheral joint part 102 defines an inflated shape of an inflating portion (a portion inflated by introduction of gases) and is provided to assume a linear, curvilinear, or U-shaped configuration, which consists of a combination of the former two configurations, continuous to the outer peripheral joint part 101. Also, the curtain bag shown in the Patent Document 1 includes a gas inflow port 103, to which a gas generator (inflator) is connected, on a rear and upper portion of the bag.

Figure 20:
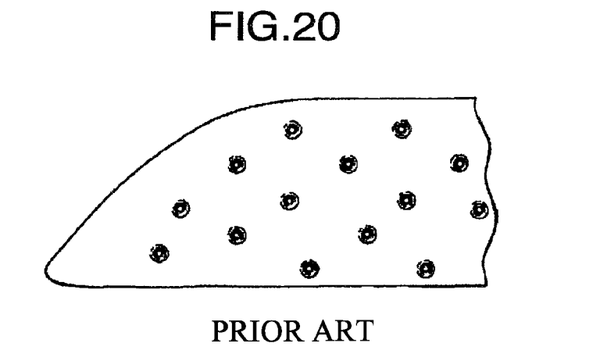
FIG. 20 A schematic view showing a conventional curtain bag described in German Utility Model Specification No. 29903409.
Figure 21:
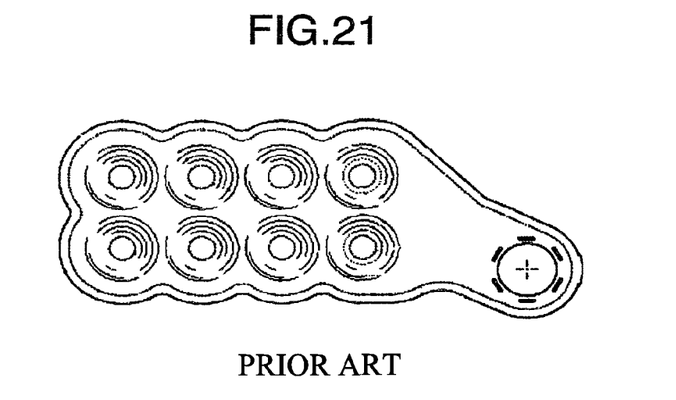
FIG. 21 A schematic view showing a conventional curtain bag described in U.S. Pat. No. 5,566,977.

Also, conventional curtain bags include ones having an inner joint part, which is independent of an outer peripheral joint part and shown in FIG. 20 in Patent Document 2, or FIG. 21 in Patent Document 3.

In forming the outer peripheral joint part and the inner joint part, a system by means of machine-sewing and a system (referred below to as OPW system), in which a weaving machine on which a Jacquard machine is mounted is made use of to cross threads in predetermined positions and in a predetermined configuration at a weaving stage to form a joint part, are put to practical use. Also, there exists a type, in which a gas inflow port is provided on an upper portion of a bag. Further, curtain bag systems include ones of two kinds, that is, one (first impact accommodating type), in which a passenger is simply protected immediately only after lateral collision, and one (roll over accommodating type), which takes account of protection of a passenger also in the case where an automobile turns sideways after lateral collision.

Patent Document 1: U.S. Pat. No. 6,010,149
Patent Document 2: German Utility Model Specification No. 29903409
Patent Document 3: U.S. Pat. No. 5,566,977

DISCLOSURE OF THE INVENTION

Problems to be solved by the Invention

By the way, in case of assuming a lateral collision, a distance between a passenger and a structure in an automobile compartment, against which the passenger is struck, corresponds to a distance between the passenger and a lateral window. The distance is small as compared with a distance between a passenger on a driver's seat and a steering wheel and a distance between a passenger on an assistant driver's seat and an instrument panel in case of assuming a frontal collision. Therefore, it is required as one of important performances demanded to a curtain bag to develop from a folded state in a short period of time, to have gases flowing appropriately into a necessary part, and to inflate up to a predetermined internal pressure until a passenger's head comes into contact with the bag.

With conventional curtain bags, however, several, comparatively large inflating portions are formed from a small number of inner joint parts assuming a linear, curvilinear, or U-shaped configuration, which consists of a combination of the former two configurations, continuous to the outer peripheral joint part. Therefore, gases in the bag are small in flow speed and so it is difficult to distribute gases from a gas generator to inflating portions in a short period of time. In particular, with a curtain bag, in which inner joint parts are U-shaped to form inflating portions called cells or cabins, there is generated a phenomenon that a certain cabin inflates but other cabins, which should inflate, are still in the course of inflation.

Also, since gases from a gas generator cannot be quickly and appropriately distributed, an increase in internal pressure is locally generated, so that an excessive load applies on outer peripheral joint parts and inner joint parts around the pressure increased portions. Further, since conventional curtain bags comprise several inflating portions and one inflating portion is large in volume, loads to be applied on outer peripheral joint parts and inner joint parts increase.

Figure 22:
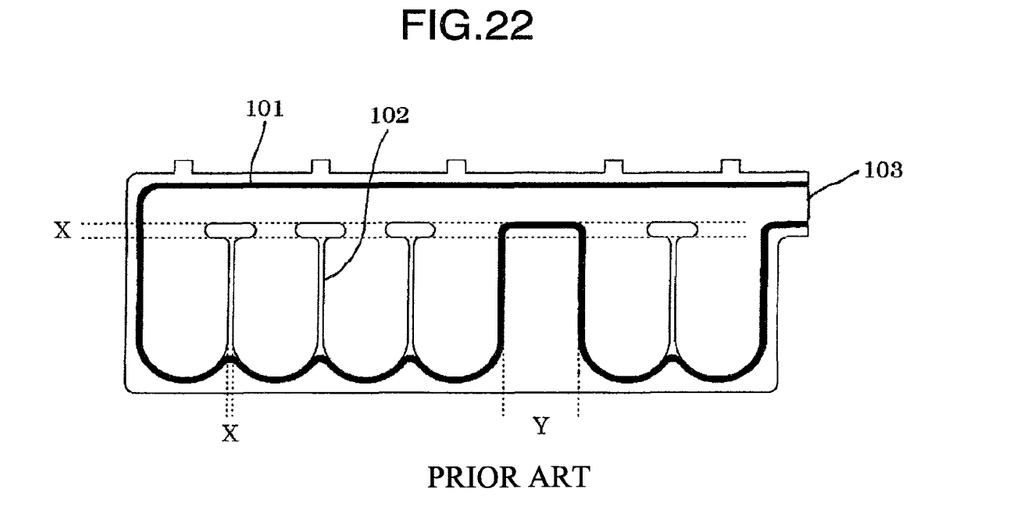
FIG. 22 A schematic view showing a further, conventional curtain bag.

Also, with conventional curtain bags having inner joint parts being independent of outer peripheral joint parts, inflating portions having a uniform size are formed to be uniformly arranged irrespective of locations on the curtain bag as shown in FIGS. 21 and 22. Therefore, the independent inner joint parts act as resisting portions to gas flow from a gas generator, an excessive stress is generated there and gases leak from the portions, so that it is difficult to maintain the function of an air bag.

Also, since a portion of the bag, which is not needed to inflate, for example, a portion corresponding to a pillar portion of an automobile inflates also in the same manner as protect portions, wasted gases are needed, so that a large-sized gas generator is made necessary. Further, with conventional curtain bags, in which independent inner joint parts are uniformly arranged irrespective of locations on the curtain bag, a pillar portion and inflating portions inflate uniformly, so that a curtain bag is increased in volume of inflation, inflation speed becomes slow, and gas flow passages of inflating portions positioned in the pillar portion are large, so that the flow speed of the gases becomes slow and gases being supplied to those inflating portions, which should be protected, also becomes slow.

Accordingly, with conventional curtain bags, since an increase in internal pressure is locally generated and inflating portions are large in volume, an excessive load is liable to apply on the outer peripheral joint parts and the inner joint parts, so that the bag bursts occasionally in the course of inflation. Also, even when burst does not occur, gases flow out due to partial breakage and peeling-off of a coating film and so a predetermined internal pressure required for protection of a passenger is not obtained in some cases. In particular, with roll over accommodating type bags, it is occasionally difficult to maintain a predetermined internal pressure for a predetermined period of time.

Therefore, there exists also a method of reducing the phenomenon described above by means of mounting a gas distributing member, which is generally referred to as inner tube, to a conduit tube of a gas generator in a bag. However, the bag becomes heavy, decreases in easiness in storage, and increases in cost. Also, with bags of OPW system, in order to cope with the phenomenon described above, it has been intended to increase strength of a woven fabric and it has been intended to prevent gas leakage due to sieve opening of the outer peripheral joint parts and the inner joint parts. However, for the purpose of them, it is required that a woven fabric of high density be formed from threads of high fineness and a large quantity of coating agent be applied. Also, with machine-sewing type bags, reinforcement is partially accomplished and a thick sealing material is interposed and sewn between two pieces of cloth about the outer peripheral joint parts and the inner joint parts. In either case, as a result of such disposal, bags are made heavy, bulky and poor in easiness of storage, and increase in cost.

With conventional curtain bags, inflating portions are frequently formed from U-shaped cabins as shown in FIG. 22. With bags of such shape, the possibility that an outer peripheral joint part 101 and an inner peripheral joint part 102 are formed is high in specified warp and/or specified weft as in a region indicated by X in the figure as compared with other warps and/or specified wefts. In addition, the reference numeral 103 in FIG. 22 denotes a gas inflow port.

An outer peripheral joint part and an inner peripheral joint part of a curtain bag of OPW system are woven into one cloth by crossing weaving yarns of two cloths and two times in density of weaving that of inflating portions, in which two pieces of cloth are separate from each other, so that the outer peripheral joint part and the inner peripheral joint part are greater in bending rate of weaving yarn than the inflating portions. Therefore, warp threads (or weft threads), which frequently form the outer peripheral joint part and the inner peripheral joint part, are woven at a weaving stage with a high tension as compared with warp threads (or weft threads), which less frequently form the outer peripheral joint part and the inner peripheral joint part, so that strain is present in a woven fabric to generate draw and wrinkles between the both. Such draw and wrinkles are responsible for disadvantages in subsequent processes. Such draw and wrinkles are responsible for generation of unevenness in coating of a coating agent in, for example, a coating process, and are responsible for generation of failure in cutting to a predetermined geometry in a cutting process.

Also, in the case where a rate, at which the outer peripheral joint part and the inner peripheral joint part are concentrated on certain warp threads (or weft threads), is high, stress concentration is liable to occur at boundaries between the outer peripheral joint parts and the inner peripheral joint parts, and the inflating portions at a stage, at which the bag inflates, the portions becoming an origin of breakage of the bag in some cases. With machine-sewing type bags, since an ordinary, plain weave fabric is woven and two pieces of cloth are sewn after a coating processing and cutting, strain at a weaving stage is not internally present as in the OPW system, but in the case where a rate, at which the outer peripheral joint part and the inner peripheral joint part (sewn portion) are concentrated on certain warp threads (or weft threads), is high, the outer peripheral joint part, the inner peripheral joint part, and the inflating portions are different in load-elongation percentage characteristics, so that stress concentration is liable to occur in the portions in the same manner as described above.

Further, since conventional curtain bags comprise several, inner peripheral joint parts, it is necessary to determine the design of the bag according to a shape, in particular, a roof configuration of an automobile and a position, in which a passenger is seated, so that a head injury criteria of a dummy becomes equal to or less than a reference criteria in a crash test. Therefore, a great deal of manhour and a long period of time are required in design and testing for determination of a bag configuration every vehicle classification.

Also, it suffices according to current regulations that a sitting posture of a dummy be a prescribed, normal sitting posture and satisfy a criteria of injury, but a passenger's sitting posture is very various to involve the possibility that an adequate protective effect cannot be expected according to a posture.

It is an object of the invention to obtain a necessary inflated state in a short period of time in a curtain bag without local application of an excessive load on the outer peripheral joint part and the inner joint part.

A further object of the invention is to provide a curtain bag, which meets the following matters:
1. Breakage should be eliminated when a bag inflates and when a passenger should be protected.
2. When an automobile collides, gases should flow into necessary portions of a bag as quickly as possible to inflate stably and quickly.
3. In an area (generally, referred to as a protective area), in which a passenger's head comes into contact with a bag and the head is protected, inflating portions are easy to set in appropriate positions in view of a roof design of a vehicle and a passenger's sitting posture.
4. It is easy to maintain a predetermined internal pressure for a predetermined period of time after the bag inflates when bags are roll over accommodating type bags, which take account of protection of a passenger in the case where an automobile turns sideways after lateral collision.
5. A bag should be lightweight and can be stored compactly.
6. A predetermined injury criteria can be cleared.

Means for Solving the Problems

The invention provides a curtain bag comprising at least two pieces of cloth joined to each other at an outer peripheral joint part provided at an outer peripheral edge thereof and at a plurality of dot-like inner joint parts provided inside the outer peripheral joint part, and wherein the plurality of dot-like inner joint parts are provided to be independent of the outer peripheral joint part and independent of one another, and provided more densely in a region, which comes into contact with a pillar portion of an automobile at the time of inflation, than in the remaining region.

ADVANTAGES OF THE INVENTION

With a curtain bag according to the invention, dot-like inner joint parts are provided independently of the outer peripheral joint part and of one another and arranged in a region, which comes into contact with a pillar portion of an automobile upon inflation, more densely than in remaining regions. Therefore, the small, dot-like inner joint parts are arranged dispersedly, so that gases from a gas generator can be distributed to inflating portions in a short period of time and so a bag inflates stably, non-damagingly, and quickly without an excessive stress concentration on the outer peripheral joint part and the inner joint parts, thus enabling effectively absorbing an impact on a passenger. Also, such reduction in stress concentration further enables making original yarn small in fineness, making a woven fabric small in density, and reducing a quantity of coating, so that it is possible to expect cost reduction, lightening, an improvement in capacity of storage for a bag. Further, draw and wrinkles generated at a boundary between the outer peripheral joint part and the inner peripheral joint parts, and the inflating portions are decreased, so that it is possible to decrease unevenness in coating at the time of coating and erroneous cutting at the time of cutting.

Further, a portion, by which a passenger's head is protected, is increased in area, manhour and a period of time for design and testing of a bag can be considerably reduced, it is easy to accommodate for a change in a passenger's sitting posture, and it is possible to inhibit a passenger's body from partially protruding outside a vehicle.

BEST MODE FOR CARRYING OUT THE INVENTION

A detailed explanation of a best mode for carrying out the invention will be described.

In a curtain bag according to the invention, at least two pieces of cloth are joined to each other at an outer peripheral joint part provided at outer peripheral edge thereof and at a plurality of dot-like inner joint parts provided inside of the outer peripheral joint part, and the inner joint parts are independent of the outer peripheral joint part and of one another.

Cloth used for the curtain bag according to the invention comprises a woven fabric and fibers are not specifically limitative but preferably comprise continuous synthetic fiber such as polyamide yarn, polyester yarn, etc. In case of using a pyro-type inflator making use of a solid gas generating agent and a hybrid inflator making use of high pressure gases and a solid gas generating agent in combination, Nylon 66 fibers are further preferable since there is a fear of melting due to high-temperature gases from a gas generator and residue of combustion.

While original yarn is not specifically limited in fineness, 78 to 940 dTex are preferable, and 235 to 475 dTex are further preferable. 78 dTex or higher can withstand a dynamic load applied by gases jetting from a gas generator and a thermal load due to high-temperature gases and residue of combustion in the case where a pyro-type inflator and a hybrid inflator described above are used. Also, 940 dTex or less is satisfactory in terms of strength and includes many points of intersection of warp threads and weft threads even when being woven in high density, so that sieve openings of the outer peripheral joint part and the inner joint parts formed by an internal pressure in operation are hard to generate and there is no fear of outflow of gases from the portions. Also, a woven fabric as finished is thin and lightweight to achieve an improvement in storagebility of a bag.

At the time of weaving, warp threads may be used as they are in the form of original yarn since an ordinary plain weave fabric is produced in the case where a bag is manufactured in a machine-sewing system, and are preferably subjected to oiling, waxing, or sizing to be used when occasion demands. In case of manufacturing a bag by means of the OPW system, sizing is preferably carried out since warp threads and weft threads in predetermined portions of two pieces of cloth are caused to intersect each other to form the outer peripheral joint part and the inner joint parts while the pieces of cloth are woven at the same time, so that the outer peripheral joint part and the inner joint parts become two times in density of weaving that of the inflating portions, a load on warp threads in weaving is large, yarns are easily napped to frequently bring about defects of weaving, and cutting of the original yarns is brought about according to circumstances.

It suffices to select a density of weaving in accordance with the fineness of original yarns as used, such that, for example, 90 to 110 of warp threads and weft threads in all/2.54 cm is preferable for 470 dTex, about 125/2.54 cm is preferable for 350 dTex, and about 145/2.54 cm is preferable for 235 dTex. Such ranges of density of weaving make weaving easy and achieve an improvement in quality of weaving and grade of a woven fabric. Also, it is possible to withstand a dynamic load applied by gases jetting from the gas generator and a thermal load.

In case of curtain bags, it is necessary to inflate the bag as quickly as possible, an in case of roll over accommodating type bags, it is necessary to maintain a predetermined internal pressure for a predetermined period of time, and a coating processing described later is preferably performed in order to prevent gases from flowing out a piece of cloth itself, the outer peripheral joint part, and the inner joint parts. In the ranges of density of weaving described above, a quantity of a coating agent permeating an interior of a woven fabric is moderate and a continuous coating film to a surface of the woven fabric is easy to form, so that an improvement in gastightness is achieved.

It is not necessarily required that warp threads and weft threads be the same in density of weaving but a difference in the density may be involved taking into consideration an efficiency of weaving or a direction of a dynamic load applied by gases as jetted.

Figure 1:
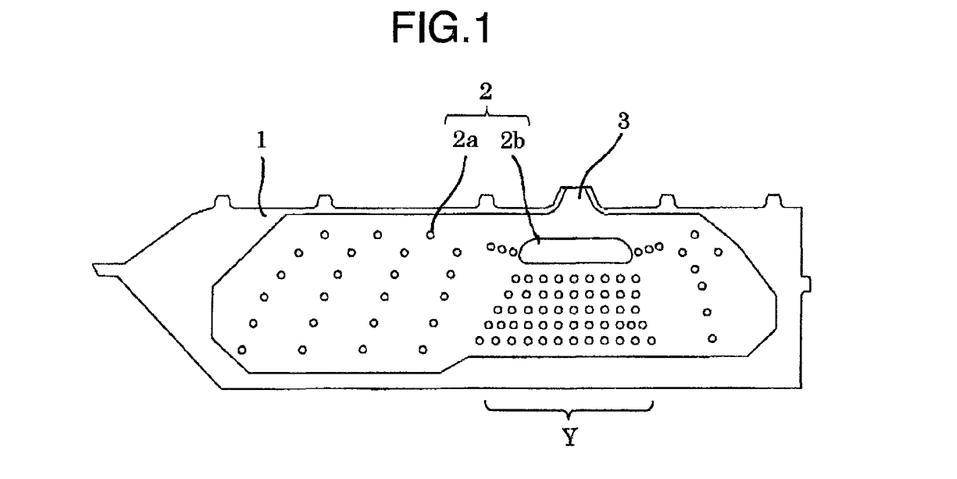
FIG. 1 A view showing a first example of a curtain bag according to the invention.
Figure 2:
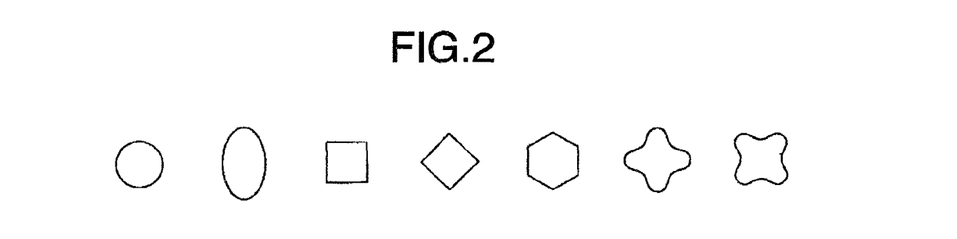
FIG. 2 A view showing configuration examples of an inner joint part.

FIG. 1 is a view showing a first example of a curtain bag according to the invention and FIG. 2 is a view showing configurational examples of an inner joint part.

As shown in the drawings, the curtain bag according to the invention comprises two pieces of cloth joined together at an outer peripheral joint part 1 provided at an outer peripheral edge thereof and at a plurality of dot-like inner joint parts 2 provided inside of the outer peripheral joint part 1. In addition, the reference numeral 2a denotes inner joint parts, which assume a shape of a circular dot and are comparatively small in area, out of the inner joint parts 2 and the reference numeral 2b denotes inner joint parts, which assume a shape of a trapezoid with rounded corners and is comparatively large in area.

Particularly, in case of the curtain bag according to the invention, the plurality of dot-like inner joint parts 2 are not consisted of a small number of, for example, several straight lines and curved lines as in conventional curtain bags, but are provided 15 to 160, preferably, 15 to 150 in number to be independent of the outer peripheral joint part 1 and of one another. In the case where the dot-like inner joint parts 2 are smaller in number than 15, it is necessary to make the respective dot-like inner joint parts 2 extremely large in area in order to make a thickness at the time of inflation of the bag appropriate, and so an appropriate inflating portion (a passenger protective area) is not obtained. On the other hand, in the case where the dot-like inner joint parts 2 exceeds 160 in number, it is necessary to make the respective dot-like inner joint parts 2 extremely small in area in order to make a thickness at the time of inflation of the bag appropriate, and there is also caused a fear that appropriate diffusion of gases is obstructed.

The dot-like inner joint parts 2 in the invention comprise non-inflating portions formed by integrating two pieces of cloth by means of intersection, or sewing, or bonding of weaving yarns constituting the two pieces of cloth, and include the non-inflating portions in which upper and lower pieces of cloth are integrated with each other over whole surfaces of the non-inflating portions and the non-inflating portions in which the upper and lower pieces of cloth are integrated with each other at the periphery of the non-inflating portions but are not integrated with each other inside the periphery. The dot-like inner joint parts 2 can be formed to be shaped as shown in FIG. 2 as well as being formed assuming the shape of a straight line segment and a curved line segment. The dot-like inner joint parts can be made, for example, circular, elliptical, rectangular, rhombic, or polygonal in shape, or can assume a shape, in which these shapes are partially changed. The dot-like inner joint parts 2 in the invention may comprise non-inflating portions which are obtained by integrating a whole surface of such shapes by means of intersection or sewing of weaving yarns, or non-inflating portions which are obtained by integrating only an outer peripheral edge of such shapes by means of intersection or sewing of weaving yarns and an interior of which is not integrated but not inflated by gases.

The respective dot-like inner joint parts 2 in the curtain bag according to the invention preferably have an area of 0.7 cm$^2$/part to 80 cm$^2$/part, further preferably, an area of 3 cm$^2$/part to 13 cm$^2$/part. When the respective dot-like inner joint parts 2 have an area of 0.7 cm$^2$/part or larger, inflating portions are made moderate, so that a load on the portions is small to lead to less rupture. Also, when the respective dot-like inner joint parts 2 have an area of 80 cm$^2$/part or less, inflating portions are likewise made moderate, so that a predetermined internal pressure is resulted and a thickness at the time of inflation of the bag is made appropriate.

The dot-like inner joint parts 2 may be the same in shape and in area throughout the bag, or ones being different in shape and in area may be mixedly present. Preferably, the shape and the area of the dot-like inner joint parts 2 are determined taking into consideration of a size of a bag, an output of and a position of a gas generator as used.

The curtain bag shown in FIG. 1 includes a gas inflow port 3, to which a gas generator is connected, substantially centrally of an upper portion thereof and an inner joint part 2b being trapezoidal in shape with rounded corners and being comparatively large in area is provided in the vicinity of and in opposition to the gas inflow port 3. The inner joint part 2b functions to distribute gases flowing into the bag through the gas inflow port 3 and preferably has a larger area (an area of 80 cm$^2$/part or larger) than the area described above in order to appropriately distribute gases. In addition, the inner joint part 2b can assume a shape shown in FIG. 2 or a further shape as well as a shape of a trapezoid with rounded corners.

Also, in the curtain bag shown in FIG. 1, inner joint parts 2a having a shape of a circular dot and being comparatively small in area are provided in and in the vicinity of a portion (a region indicated by Y in the drawing), which comes into contact with a pillar portion at the time of inflation, to be distributed densely, preferably, two to ten times those in a portion in non-contact with a pillar portion.

In conventional curtain bags, a portion, which comes into contact with a pillar portion of an automobile at the time of inflation, is in many cases structured to be partially closed and not to inflate (for example, a region indicated by Y in FIG. 22). When such portion is not closed but structured to be provided densely with the dot-like inner joint parts 2a as described above, however, it is possible to realize a quality of cushioning on the portion which comes into contact with the pillar portion owing to a little inflation to improve the protective function while preventing the portion which comes into contact with the pillar portion from excessively inflating to bring about waste of gases and deformation of the bag. Also, by restricting inflation of the portion which comes into contact with the pillar portion, it is made possible to further quickly promote uniformity in gas pressure before and after the inflation. In addition, the dot-like inner joint parts 2a can assume a shape shown in FIG. 2 or a further shape as well as a circular shape.

FIGS. 3 to 6 are views showing second to fifth examples of the curtain bag according to the invention. In FIGS. 3 to 6, the same reference numerals as those in FIG. 1 denote the same parts or members as those in the latter.

As described above, the respective dot-like inner joint parts 2 in the curtain bag according to the invention may be the same or may not be the same in shape and in area in a bag.

Figure 3:
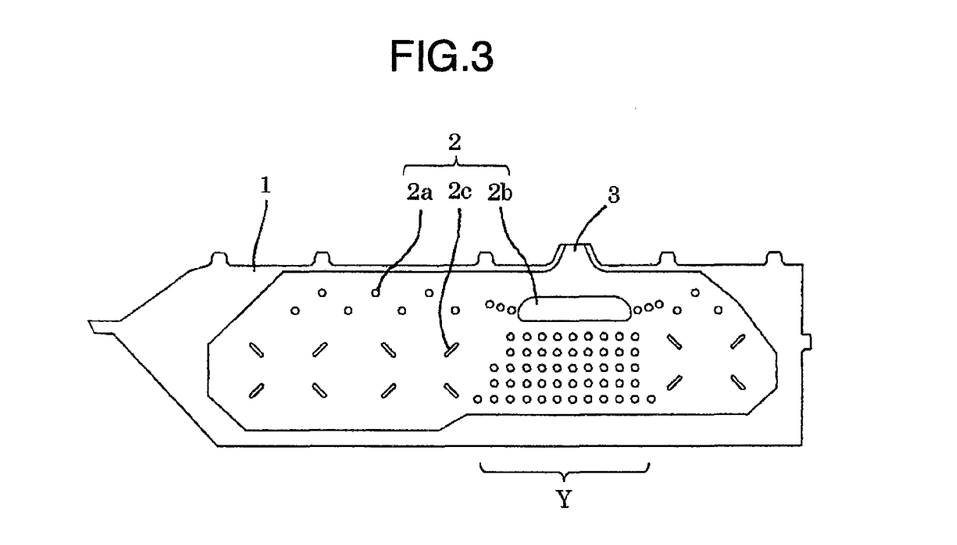
FIG. 3 A view showing a second example of a curtain bag according to the invention.

The second example shown in FIG. 3 is one, in which line segment inner joint parts 2c are arranged in lower portions forwardly of and rearwardly of a portion which comes into contact with a pillar portion of an automobile.

Figure 4:
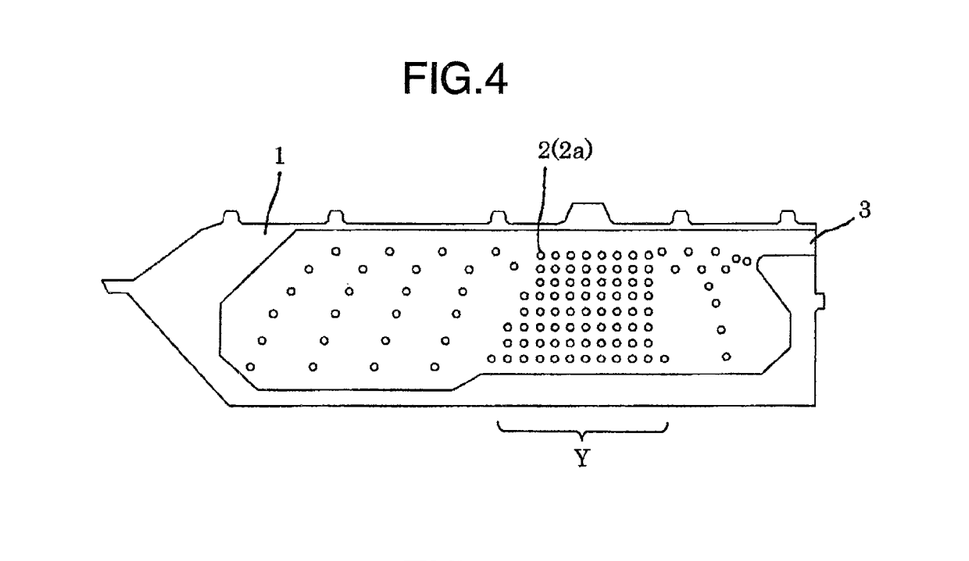
FIG. 4 A view showing a third example of a curtain bag according to the invention.

The third example shown in FIG. 4 comprises a bag of a type, in which a gas generator (not shown) is connected to a rear, upper portion of the bag and a gas inflow port 3 is provided in the rear, upper portion of the bag. Also, all inner joint parts 2 comprise inner joint parts 2a in the form of a circular dot and comparatively small in area. The dot-like inner joint parts 2a are arranged in a portion, which comes into contact with a pillar portion of an automobile at the time of inflation, and in the vicinity of the gas inflow port 3 to be distributed more densely than in the remaining regions, preferably, two to ten times those in the remaining regions. Owing to a state, in which the dot-like inner joint parts 2a are arranged, it is possible to obtain functions of preventing an excessive inflation of a portion which comes into contact with a pillar portion and appropriately distributing inflowing gases.

Figure 5:
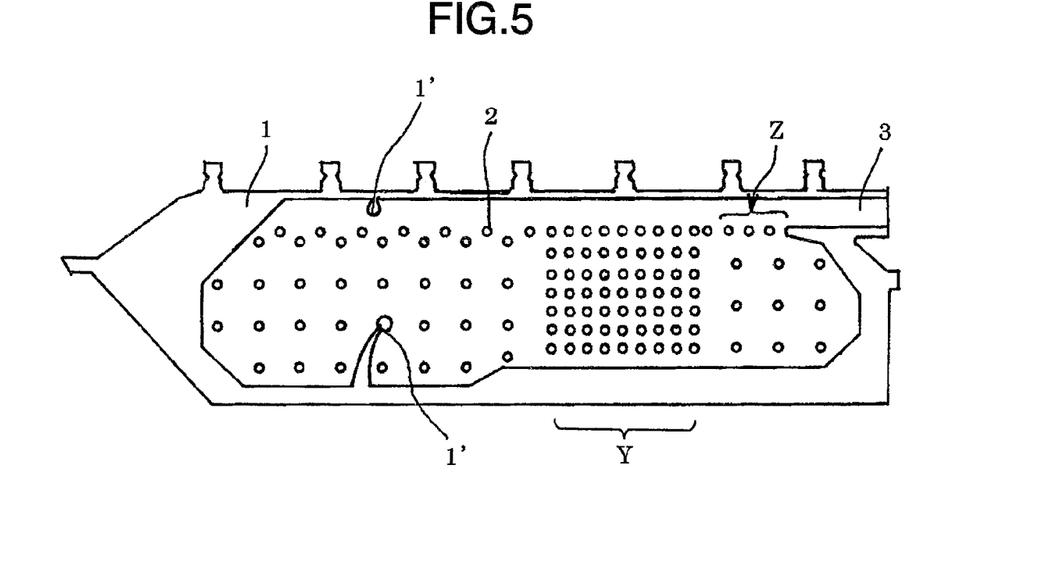
FIG. 5 A view showing a fourth example of a curtain bag according to the invention.

The fourth example shown in FIG. 5 comprises a bag of a type, in which a gas generator is connected to a rear, upper portion of the bag, and is fundamentally the same as that shown in FIG. 4 except a state, in which inner joint parts 2 are arranged in the vicinity of a gas inflow port 3. By the way, it is required that when the gas generator operates, gases flowing from the gas generator be first fed forwardly of the bag to spread the folded bag downwardly. In order to cope with a large load applied to the bag at an initial stage of gas inflow and to quickly feed the jetting gases forward, the inner joint parts 2 are desirably arranged in the vicinity of the gas inflow port 3 and in positions, which are in parallel to a gas jetting direction and in which gases are not prevented from jetting forward, to be distributed more densely than and preferably, two to ten times those in the remaining regions (except a portion, which comes into contact with a pillar portion of an automobile at the time of inflation). As a specific example of arrangement, it is possible to list an arrangement, in which the inner joint parts are aligned clear of a forward front of the gas inflow port 3 and forwardly of a lower end of the gas inflow port 3 in series in a longitudinal direction like the inner joint parts 2 in a region indicated by Z in FIG. 5.

On the other hand, with a view to preventing gases from jetting extremely forward at an initial stage of operation of a gas generator, distributing a part of inflowing gases downwardly, or further absorbing an impulse to a passenger, it is preferable in some cases to form protruding joint parts 1', which partially protrude inside the bag, on an outer peripheral joint part 1 in order to change the shape of the bag after inflation.

Figure 6:
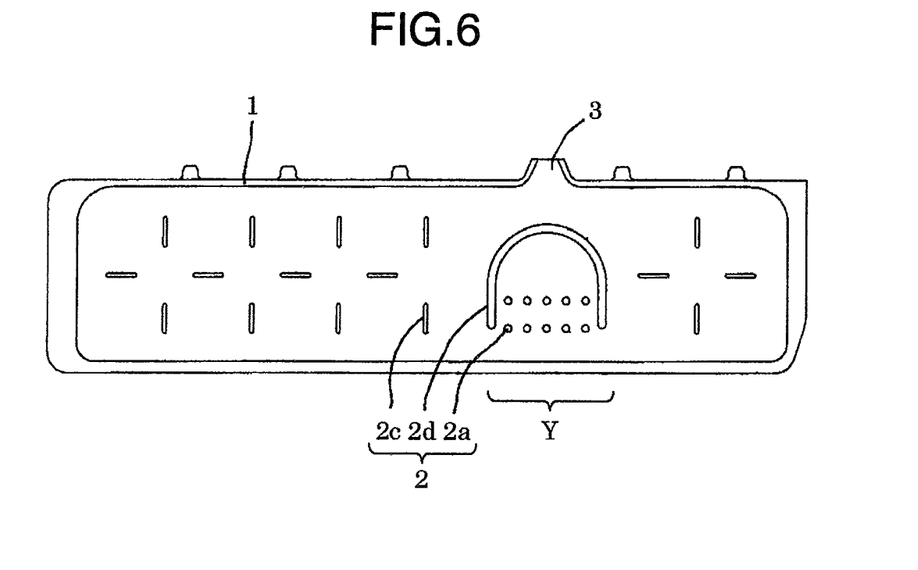
FIG. 6 A view showing a fifth example of a curtain bag according to the invention.

The fifth example shown in FIG. 6 is one, in which inner joint parts 2a in the form of a circular dot 2a, a line segment inner joint part 2c, and an inverted U-shaped inner joint part 2d are used as inner joint parts 2. The inverted U-shaped inner joint part 2d is provided in the vicinity of and in opposition to a gas inflow port 3 provided rearward in an upper portion of a bag to function to distribute gases forwardly and rearwardly like the inner joint parts 2b shown in FIG. 1. The inner joint parts 2a in the form of a circular dot are provided in the vicinity of a downwardly directed opening of the inverted U-shaped inner joint part 2d whereby excessive inflation of a portion which comes into contact with a pillar portion is restricted.

According to the invention, since the dot-like inner joint parts 2 are independent of an outer peripheral joint part 1 and the dot-like inner joint parts 2 are independent of one another, it is possible to set, in particular, the dot-like inner joint parts 2 so that an arrangement of the inner joint parts is not concentrated on the same warp threads or the same weft threads. Adoption of such arrangement is useful from a point of view of uniformizing a difference in bending rate of weaving yarns between the outer peripheral joint part 1 and the inner peripheral joint parts 2, and the inflating portions over all the woven fabric, decreasing draw and wrinkles, hence decreasing unevenness in coating at the time of coating, and improving an accuracy at the time of cutting.

Figure 7:
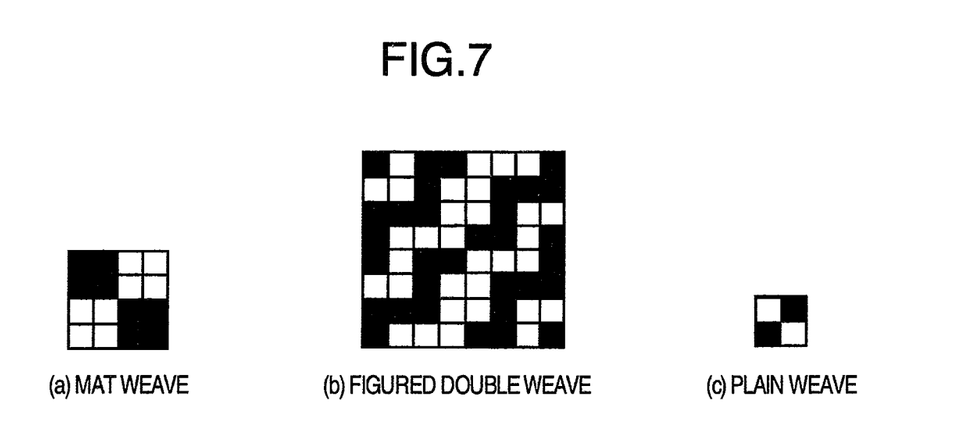
FIG. 7 A view showing an example of a textile design about a boundary between an inner joint part and an inflating portion.
Figure 8:
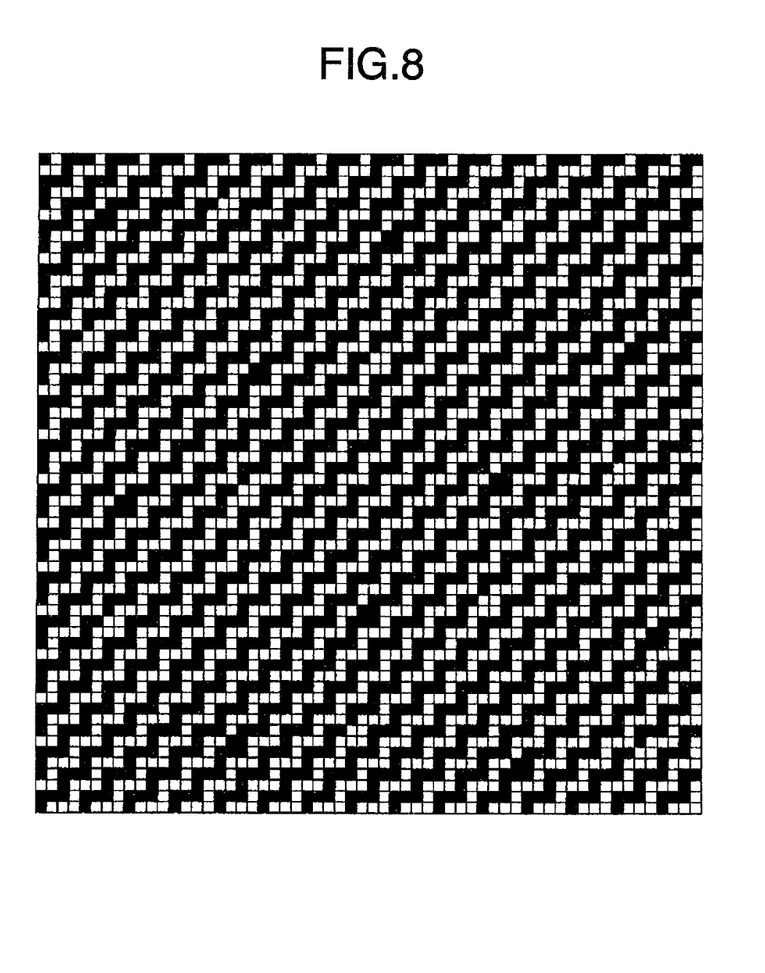
FIG. 8 A view showing an example of a textile design inside a boundary between an inner joint part and an inflating portion.

In case of OPW, the inner joint parts 2 about boundaries between them and inflating portions are not specifically limited in textile design, but it suffices to combine, for example, (a) mat weave, (b) figured double weave, and (c) plain weave shown in FIG. 7 and to appropriately repeat them. Also, portions of the inner joint parts 2 except those about the boundaries between them and inflating portions are not specifically limited in textile design but, for example, stitched double weave shown in FIG. 8 is preferable in the point of reduction of intersection.

Plain weave is normally used for the textile design in the outer peripheral joint part 1, the inner joint parts 2 and the inflating portions except the boundaries between the joint parts 1, 2 and the inflating portions.

Figure 9:
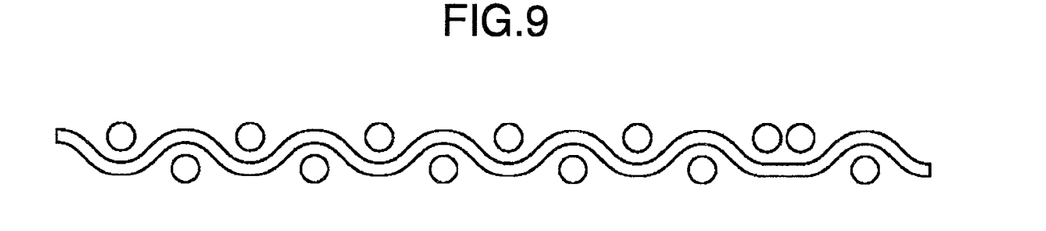
FIG. 9 A view showing an example of a textile design called striped fabric, or rip-stop.

When an automobile collides laterally against another automobile or an obstacle, a window glass is broken and the broken glass piece rarely causes damage to a bag to tear the same much according to circumstances. In order to reduce the extent of such damage as far as possible, the textile design in the outer peripheral joint part 1, the inner joint parts 2, and the inflating portions except the boundaries between the joint parts 1, 2 and the inflating portions is not made a simple plain weave but preferably made one, such as so-called check-striped fabric, or one called rip-stop, in which weaving is done in a state of aligning several yarns every predetermined number of warp threads and weft threads as shown in FIG. 9.

The number of yarns thus aligned is preferably about two or three and with the larger number than this, clearances between yarns become large and a coating agent is decreased in surface covering effect. Also, the yarns thus aligned have a clearance of 5 to 30 mm, more preferably, 10 to 20 mm. The less the clearance, the larger the clearances between yarns, so that a coating agent is decreased in surface covering effect. Also, when the yarns thus aligned have a larger clearance than that described above, there is produced a less effect of reducing damage to a bag by glass pieces.

In the case where the inner joint parts 2 are formed by means of the machine-sewing system, it suffices to stitch two pieces of woven fabric by means of a normal sewing machine, or a so-called pattern sewing machine, into which a pattern is input to accomplish automatic sewing. At this time, in the case where an air resistance is especially demanded, outflow of gases from seams can be prevented by sewing with a sealing agent interposed between two pieces of woven fabric.

In the case where the inner joint parts 2 are formed by means of the bonding system, it suffices that bonding be accomplished by applying an adhesive between two pieces of woven fabric and interposing them between two rolls of a press or a rolling mill, which is provided with a heating mechanism, to apply a compressive force on portions, to which the adhesive is applied. At this time, it does not matter whatever an adhesive is, but a silicon adhesive is used in the case where gases should be prevented from flowing out.

In case of OPW, it is preferable to normally weave warp threads by the use of original yarn, which are subjected to sizing, and subsequently to perform a coating processing in order to improve a bag in airtightness. While being particularly limited, it is preferable to scour the original yarn by means of a jigger scouring machine or a continuous scouring machine including a plurality of scouring vessels and washing vessels for the purpose of removing an oil and a sizing agent, which adhere to the original yarn, prior to coating so as to eliminate inhibition of adhesiveness between a coating agent and a piece of woven fabric. After scouring, the woven fabric is dried by a cylinder drier or the like. After being dried, the woven fabric may proceed to a subsequent coating processing as it is, but it is preferable to continuously heat-set the woven fabric after scouring and drying in order to exercise control on dimension and density of weaving.

On the other hand, with machine-sewn bags, while being not specifically limited in carrying out the invention, scouring is not necessarily needed in case of weaving without sizing of warp threads, but scouring is needed in case of using sized yarns, in which case it is preferable to perform drying or heat-setting after drying in the same manner as in the OPW system.

While a coating agent and a coating method are not specifically limited in carrying out the invention, a silicon agent is generally used as a coating agent and coating is normally performed with a knife coater. An application quantity of a coating agent differs according to properties of a silicon resin as used, whether a processing is of the OPW system or of machine-sewing system, a bag, which is used assuming only an occasion of lateral collision, and a bag, which is used assuming that an automobile turns sideways after lateral collision.

While an application quantity is not specifically limited, it is preferably 20 to 50 g/m² for a bag, which is of machine-sewing system and of the OPW system and in which turn-over of an automobile is not assumed, and preferably 50 to 150 g/m² for a bag, which is of the OPW system and in which protection of a passenger at the time of turn-over of an automobile is assumed.

In the OPW system, a product (bag) is formed by cutting to predetermined dimensions and a predetermined shape with a laser cutter after coating, sewing of an accessory such as a tether for fixation of a bag, and reinforcing a mount to a vehicle body.

In the machine-sewing system, after a woven fabric having been subjected to coating is cut to predetermined dimensions and a predetermined shape, two pieces of the woven fabric are overlapped together and sewn in a predetermined position. As described above, in the case where airtightness is specifically demanded, sewing is performed with a sealing agent such as silicon coat, etc. sandwiched about seams between two pieces of woven fabric as coated.

According to the invention, since stress generated on a bag is appropriately dispersed and uniformized, there is occasionally no need of applying the same quantity of a coating agent on two both pieces of woven fabric, which form a bag as described above. In this case, in order to reduce or prevent breakage of a bag due to rupture of a window glass at the time of collision, it is possible to increase a quantity of a coating agent applied on only a window side and to decrease an application quantity of a coating agent applied on a compartment side. By decreasing a quantity of coating on a compartment side, gases appropriately flow out of a piece of woven fabric to lead to a decrease in an injury criteria of a passenger.

Also, with curtain bags of a system, in which a passenger is protected only immediately after mere, lateral collision such as first impact, gases are appropriately held in some cases even without a coating on a compartment side to enable protecting a passenger.

Figure 12:
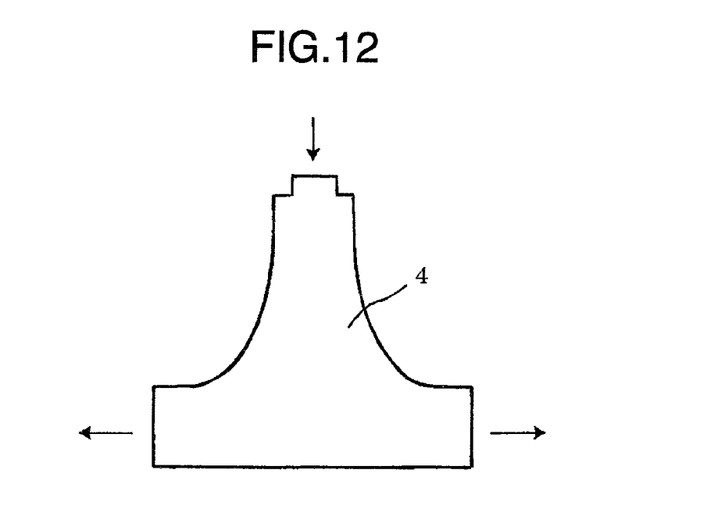
FIG. 12 A view showing a further array of an inner member.

According to the invention, in the case where a bag and a gas generator of normal sizes are used, there is no need for an inner member 4 shown in FIGS. 1 and 12 and intended for reinforcement and appropriate distribution of gases in the vicinity of a gas inflow port.

With curtain bags intended for inflation at higher speed and curtain bags for use in large-sized automobiles, in which three rows of seats for passengers are provided, however, it is necessary in some cases to use a gas generator of a higher output. Also, with gas generators making use of a solid gas generating agent and hybrid type gas generators making use of a solid gas generating agent and high pressure gases in combination, higher-temperature gases and decomposed residue of a higher-temperature solid gas generating agent as compared with gas generators of high-pressure gas type flow into a bag. In such case, the inner member 4 is preferably provided on the gas inflow port 3 to achieve reinforcement for a dynamic load and a thermal load and further, appropriate distribution of gases.

Figure 11:
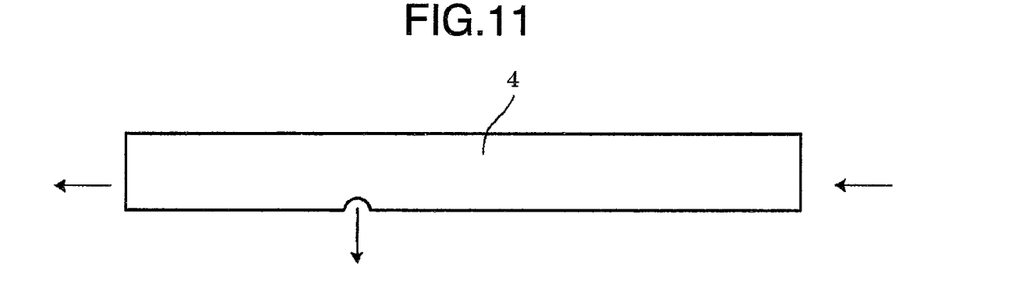
FIG. 11 A view showing an example of an inner member.

An inner member 4 shown in FIG. 11 is used for a bag of a type, which is shown in FIGS. 4 and 5, and on a rear and upper portion of which a gas inflow port 3 is provided, and ordinarily called "inner tube". Also, an inner member 4 shown in FIG. 12 is used for a bag of a type, in which a gas inflow port 3 is provided substantially centrally of an upper portion and which is shown in FIGS. 1, 3, and 6, and ordinarily called "inner bag" or "bag-in-bag". Arrows in FIGS. 11 and 12 indicate directions, in which gases inflow and outflow.

Also, instead of the inner member 4, it is preferable to apply a larger quantity of a coating agent on an outer peripheral joint part 1 around a gas inflow port 3 and on inner joint parts 2 than that in the remaining portions and to stick a patch, on which a sealing agent having a bonding function is applied, to a piece of ground fabric, which is smaller in elasticity than the woven fabric of a bag. When this is done, it is possible to prevent melting of and a decrease in strength of original yarn, which melting and decrease are caused by sieve opening of the textile design of a joint part exerted by an inner pressure and outflow of high-temperature gases and decomposed residue of a solid from the sieve opening. An application quantity of the coating agent is preferably larger by 50% to 150% by weight than that in the remaining portions. With 50% or less by weight, a poor sealing effect is produced and with 150% or larger by weight, the associated portion is made excessively thick to lead to a decrease in storagebility.

Figure 13:
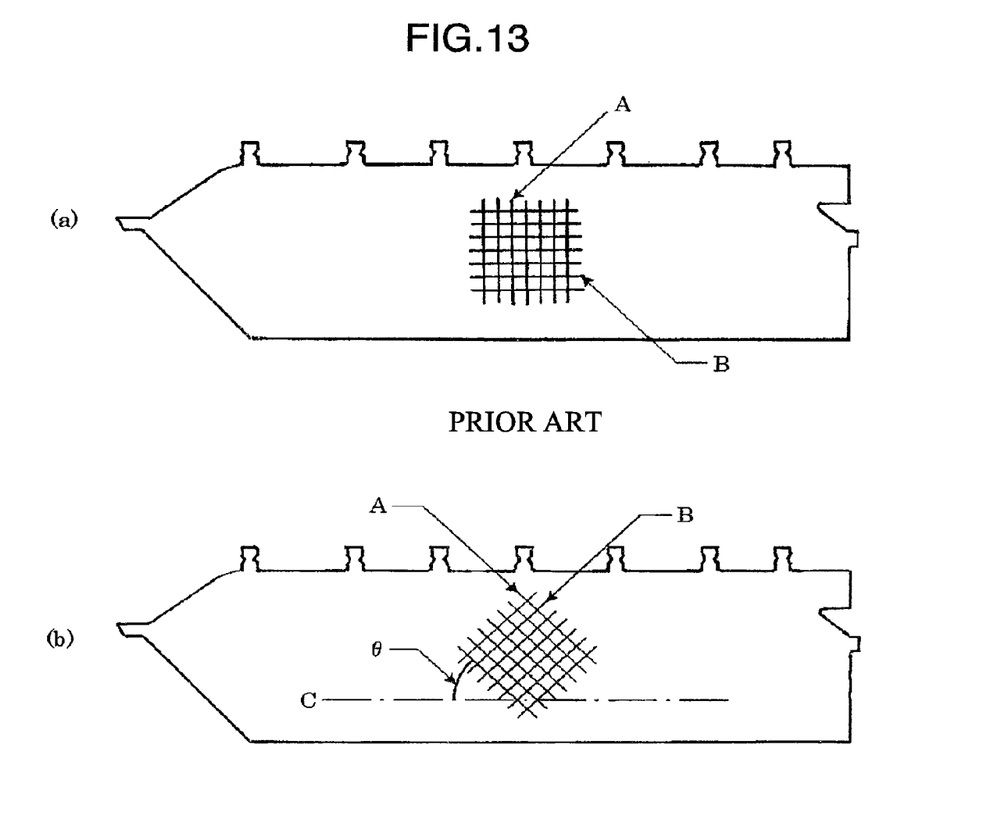
FIG. 13 A view illustrating a direction of warp threads of cloth which forms a bag.

With conventional OPW curtain bags, that cloth, which forms a bag, is woven so that warp threads are directed substantially in parallel to a length direction of the bag as shown in FIG. 13(*a*). In the drawing, A denotes warp threads and B denotes weft threads.

When a system is operated to permit gases to flow into a bag from a gas generator, however, a large tension applies in the length direction of the bag, that is, comparatively concentrates on warp threads of the woven fabric, and in that course, in which the bag inflates downward from a roof of an automobile, a large tension applies in a direction perpendicular to the length direction of the bag, that is, comparatively concentrating on weft threads of the woven fabric.

In application of the invention, weaving may be done in a conventional arrangement, but weaving is preferably done in an arrangement, in which cloth is arranged so that an angle θ between a line C in parallel to a length direction of a bag and a direction A of warp threads of that cloth, which form a bag, is made at least 20 degrees but at most 70 degrees. For example, assuming that when θ is 45 degrees and tension applying in a length direction of a bag immediately after gases inflow is 1, $1/\sqrt{2}$ of the tension is distributed to warp threads and weft threads. Also, when a bag inflates downward, assuming that a force applying in a direction perpendicular to the length direction is 1, $1/\sqrt{2}$ of the tension is likewise distributed to warp threads and weft threads, and an improvement in margin against rupture of a bag is achieved.

Assuming that an angle θ between the length direction of a bag and a direction of warp threads of a woven fabric is 45 degrees, tension is distributed equally to warp threads and weft threads, and it suffices that the angle θ be determined taking account of strength of cutting of and elasticity of warp threads and weft threads of a woven fabric, or loss due to an arrangement of a bag. Generally, the angle θ is preferably at least 20 degrees but at most 70 degrees, and the effect described above is decreased outside the range.

Also, with curtain bags of the machine-sewing system, while a plain weave fabric having been subjected to coating is cut to predetermined dimensions, it suffices to determine an arrangement of a length direction of a bag and a direction of warp threads of a woven fabric in the same manner as described above.

According to the invention, a cloth of low fineness is applicable as described above. Since a cloth of low fineness, however, becomes thin physically, the cloth becomes low in resistance to rupture of a bag as compared with cloth of high fineness. In particular, for cloth positioned on a window side, comparing with cloth of low fineness, cloth of high fineness is advantageous in terms of damage to a bag caused by fragments of a window glass. In such case, by forming cloth positioned on a compartment side from cloth of low fineness as compared with cloth positioned on a window side, and forming cloth positioned on the window side from cloth of high fineness as compared with cloth positioned on the compartment side, it is possible to provide a curtain bag being excellent in storagebility as compared with a bag, both sides of which are formed by cloths of high fineness.

Figure 10:
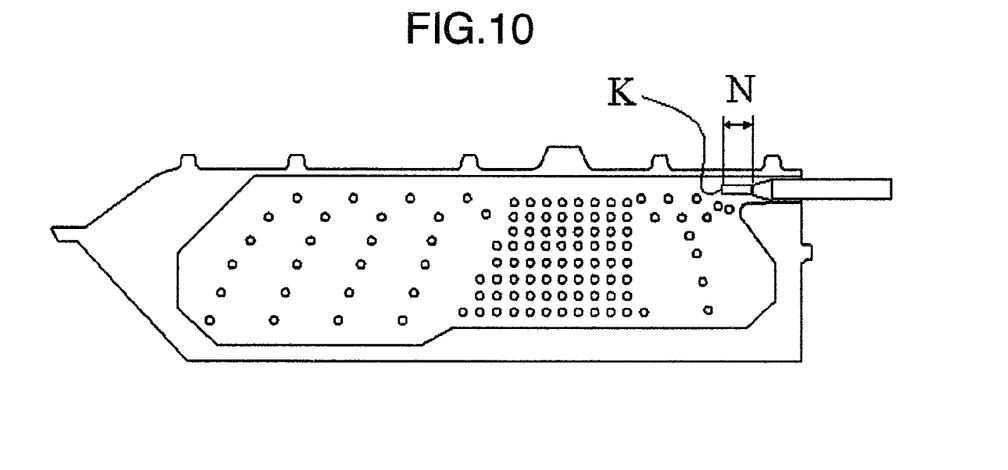
FIG. 10 A view showing a jet port of a gas generator (inflator) mounted to a bag.

According to the invention, since gases from a gas generator can be distributed to inflating portions in a short period of time as described above, inflation speed of a bag is increased. However, there is a limit to an increase in inflation speed only by the invention. In order to attain a higher speed of inflation, it is effective to adjust a state, in which gases for inflation of a bag jet from a gas generator (inflator). For example, as shown in FIG. 10, in the case where a gas jet port of a gas generator is connected to a rear and upper portion of a bag, gases are increased in straightness when an open diameter K of the gas jet port is made small, so that gases quickly reach an inflating portion being distant from the gas jet port. In particular, according to the invention, it is possible to provide a curtain bag, in which straight advancing gases generated by a decrease in the open diameter K of the gas jet port can be appropriately distributed to a predetermined protective area owing to an excellent gas dispersing performance and which can attain uniform inflation at high speed without generation of local inflation by the straight advancing gases.

While the open diameter K of a gas jet port of a gas generator mounted to a bag is dependent upon fineness of a curtain air bag as used or the like, it preferably ranges from about at least 5 mm to at most 10 mm since in case of less than 0.5 mm, there is a risk that the gas jet port is clogged by the residue of gases as jetted and in case of over 30 mm, gases immediately after being jetted spread widely. Also, a length N of a gas jet port connected to a bag is not specifically limited, a shape, in which a tip end is throttled, is preferable in that range, in which the ratio N/K is at least 5 but at most 20.

EMBODIMENT

Subsequently, the invention will be specifically described by means of embodiments and referential examples.

(1) Deployment Test

A cold gas type inflator (maximum pressure 220 kPa in 23.81 tank pressure test) manufactured by Autoliv Company and a bag inner pressure measurement sensor were mounted to a testing sample, a bag deployment test was conducted, high speed photography of a state, in which a bag developed, was conducted, and changes in bag inner pressure were measured. Deployment speeds indicated in TABLE 1 are represented in terms of time elapsed until the bag inner pressure reached 60 kPa.

(2) Impactor Test

The inflator and the bag inner pressure measurement sensor, which are described above, were mounted to a testing sample, an impactor test was conducted by a method prescribed in FMVSS201U method, and a head injury criteria HIC was found from a head's deceleration.

Embodiment 1

Figure 14:
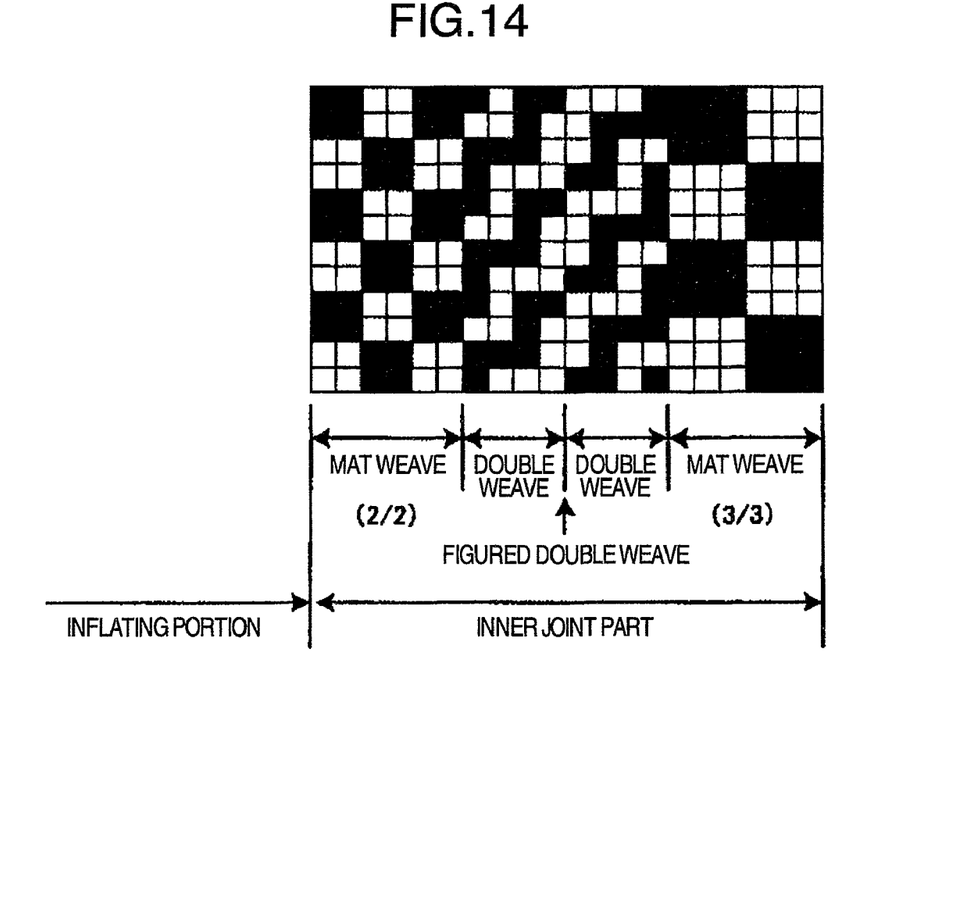
FIG. 14 A view showing a textile design about a boundary between an inner joint part used in an embodiment and an inflating portion.
Figure 16:
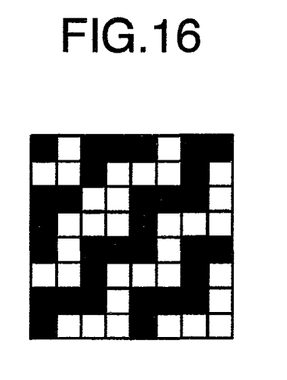
FIG. 16 A view showing a textile design inside a boundary between an inner joint part used in an embodiment and an inflating portion.

Yarns, which were formed from Nylon 66 original yarn manufactured by Polyamide High Performance Company to be 470 dTex in fineness and in which the number of single yarns was 144, were used with warp threads being subjected to sizing by a sizing agent having a main component of polyacrylic acid to weave a woven fabric having a shape shown in FIG. 6 so that the finished density of weaving was made warp 57/2.54 cm and weft 46/2.54 cm by an air-jet loom (manufactured by Dornier Company) mounting thereon a Jacquard machine (manufactured by Stäubli Company). In a bag, segmental inner joint parts $2c$ were 16 in number to have a length of 8 cm, a width of 1 cm, and an area of 8 cm², dot-like inner joint parts $2a$ were 10 in number to have an area of 3 cm², inverted U-shaped inner joint part $2d$ was 1 in number to have a length of about 130 cm, a width of 1 cm, and an area of 130 cm², inflating portions were of plain weave structure, the respective inner joint parts 2 about boundaries between them and the inflating portions were of a structure shown in FIG. 14, and a textile design inside about boundaries between the respective inner joint parts 2 and the inflating portions was made one shown in FIG. 16.

The woven fabric after weaving was subjected to scouring by a continuous scouring machine and after being dried, it was heat-set at 180° C. for one minute by a pintenter. A silicone resin (Product No. DC3730 manufactured by Toray•Dow Corning•Silicone Company) was applied 85 g/m² per one side of the woven fabric, which was subjected to scouring and heat-set, by means of a knife-coating method, the woven fabric was heated at 180° C. for three minutes in a heating furnace, then a silicone surface smoothing agent (Product No. DC3715 manufactured by Toray•Dow Corning·Silicone Company) was applied as 10 g/m² per one side of the woven fabric by a gravure coater, and the woven fabric was dried.

Figure 15:
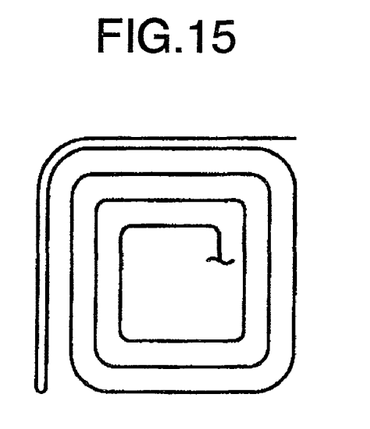
FIG. 15 A view showing a folded state of a bag used in an embodiment.

The product as coated was cut to a predetermined shape by a laser cutter (manufactured by Lectra Company), a portion mounted to an automobile body was subjected to reinforcing seam, and a tether was sewn to make a product of curtain bag. Further, the product was folded by means of the system shown in FIG. 15 and temporary tacked by a tape to fabricate a testing sample. The deployment test and the impactor test were conducted on the sample.

TABLE 1 indicates results of the tests.

Embodiment 2

Figure 17:
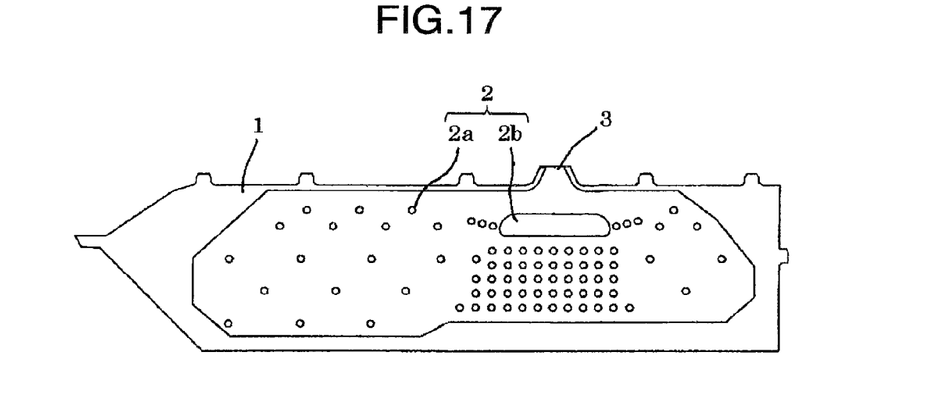
FIG. 17 A schematic view showing a curtain bag used in an embodiment.

The same method as that in Embodiment 1 was used to fabricate a bag shaped as shown in FIG. 17 and including dot-like inner joint parts 2a being 80 in number to have an area of 3 cm² and a single inner joint part 2b disposed just below a gas inflow port 3 and having a height of about 7 cm, a width of 31 cm, and an area of 20 cm², and the deployment test and the impactor test were conducted on the bag.

TABLE 1 indicates results of the tests.

Embodiment 3

The same bag as that in Embodiment 2 and shaped as shown in FIG. 17 and including only dot-like inner joint parts 2a being 160 in number to have an area of 3 cm² was fabricated, and the deployment test and the impactor test were conducted on the bag.

TABLE 1 indicates results of the tests.

Embodiment 4

The same testing sample as that in Embodiment 2 was tested under the same conditions as those in the Embodiment 2 except that a head center was downwardly offset 20 mm relative to a normal position in the impactor test.

TABLE 1 indicates results of the test.

Embodiment 5

Yarns, which were formed from Nylon 66 original yarn manufactured by Asahi Kasei Chemicals Company to be 470 dTex in fineness and in which the number of single yarns was 72, were used by the method described in Embodiment 1 to fabricate a bag shaped as shown in FIG. 17 so as to provide 63/2.54 cm in finished density, and the deployment test and the impactor test were conducted on the bag.

TABLE 1 indicates results of the tests.

Comparative Example 1

Figure 18:
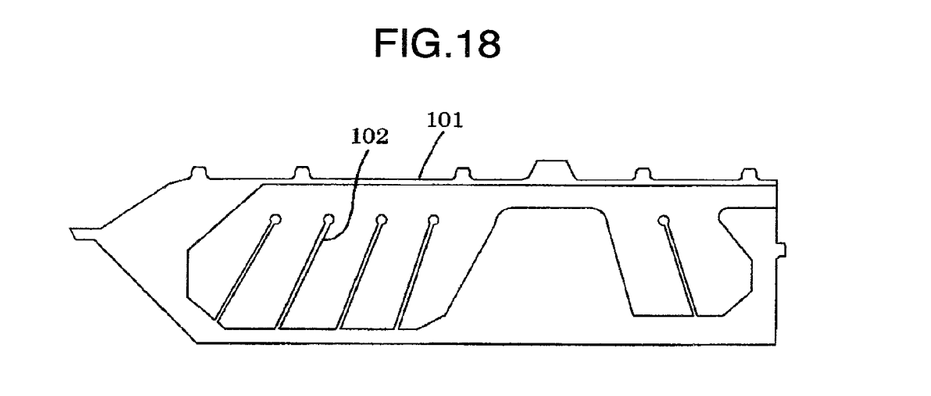
FIG. 18 A schematic view showing a curtain bag used in Comparative example.

The same method as that in Embodiment 1 was used to fabricate a bag being a conventional product shaped as shown in FIG. 18 and including five inner joint parts 102 continuous to an outer peripheral joint part 101, and the deployment test and the impactor test were conducted on the bag.

TABLE 1 indicates results of the tests.

TABLE 1

| | Shape of bag | Damage of bag | Deployment speed | Head injury criteria (HIC) |
|---|---|---|---|---|
| Embodiment 1 | FIG. 6 | None | 25 | 200 |
| Embodiment 2 | FIG. 17 | None | 20 | 200 |
| Embodiment 3 | FIG. 17 | None | 22 | 240 |
| Embodiment 4 | FIG. 17 | None | 20 | 280 |
| Embodiment 5 | FIG. 17 | None | 18 | 180 |
| Comparative Example | FIG. 18 | None | 30 | 200-280 |

As indicated in TABLE 1, a multiplicity of the independent inner joint parts 2, by which a shape of inflating portions is defined when a bag according to the invention inflates, are arranged whereby the bag is considerably increased in deployment speed as compared with conventional bags. Also, a head injury criteria HIC of a passenger obtained as a result of the impactor test is considerably lower than HIC<1000, which is a injury reference limit prescribed in the regulations, of course, in case of collision in a normal position prescribed in test standards and even in case of being offset 200 mm from a normal position, and so it is apparent that the bag is effective also in protecting a passenger's head not seated in a normal position.

INDUSTRIAL APPLICABILITY

The invention is effective in an apparatus, which protects a passenger in an automobile when the automobile suffers lateral collision. Further, the invention is also applicable in other protective apparatuses such as a side bag, which is accommodated in a seat or a door to protect a passenger's side, a pedestrian protective bag, and an air bag for motorcycles.

DESCRIPTION OF REFERENCE NUMERALS

1 outer peripheral joint part
2 inner joint part
2a inner joint part of a shape of a circular dot
2b inner joint part of a shape of a trapezoid with rounded corners
2c line segment inner joint part
2d inverted U-shaped inner joint part
3 gas inflow port
4 inner member

The invention claimed is:

1. A curtain bag comprising at least two pieces of cloth joined to each other at an outer peripheral joint part provided at an outer peripheral edge thereof and at a plurality of inner dot joint parts provided inside the outer peripheral joint part, wherein the plurality of inner dot joint parts are provided to be independent of the outer peripheral joint part and independent of one another, and provided more densely in a region, which comes into contact with a pillar portion of an automobile at the time of inflation, than in other regions, and wherein the curtain bag includes a gas inflow port provided substantially centrally of an upper portion of the curtain bag and to be connected to a gas generator, and an inner joint part having an area of 80 cm² or larger is provided in the vicinity of and in opposition to the gas inflow port.

2. A curtain bag comprising at least two pieces of cloth joined to each other at an outer peripheral joint part provided at an outer peripheral edge thereof and at a plurality of inner dot joint parts provided inside the outer peripheral joint part, characterized in that the plurality of inner dot joint parts are provided to be independent of the outer peripheral joint part and independent of one another, and provided more densely in a region, which comes into contact with a pillar portion of an automobile at the time of inflation, than in other regions, and wherein the curtain bag includes a gas inflow port provided on an upper, rear portion thereof and to be connected to a gas generator, and the inner dot joint parts are provided more densely in the vicinity of the gas inflow port than in other regions except for said region which comes into contact with a pillar portion of an automobile at the time of inflation.

3. The curtain bag according to claim 1 or 2, wherein the plurality of inner dot joint parts are at least 0.7 cm$^2$/part but at most 13 cm$^2$/part in area.

4. The curtain bag according to claim 1 or 2, wherein the plurality of inner dot joint parts are segmental, circular, elliptical, rectangular, rhombic, or polygonal in shape.

5. The curtain bag according to claim 1 or 2, wherein the plurality of inner dot joint parts are at least 15 but at most 160 in number.

6. The curtain bag according to claim 5, wherein said at least two pieces of cloth comprise a woven fabric.

7. The curtain bag according to claim 6, wherein an intersection angle between a line in parallel to a length direction of the curtain bag and warp threads of the woven fabric is at least 20 degrees but at most 70 degrees.

8. The curtain bag according to claim 6, wherein the cloth positioned on a compartment is finer than the cloth positioned on a window glass side of an automobile.

9. The curtain bag according to claim 6, wherein the outer peripheral joint part, the inner dot joint parts, and inflating portions except ones about boundaries between these joint parts and the inflating portions are made a check-striped fabric.

10. The curtain bag according to claim 5, wherein an inner member having functions of distribution of gases flowing into the curtain bag and reinforcement is mounted in the vicinity of a gas inflow port.

11. The curtain bag according to claim 5, wherein the outer peripheral joint part and the inner dot joint parts in the vicinity of a gas inflow port are coated with a coating agent.

12. The curtain bag according to claim 5, wherein patches are stuck on the outer peripheral joint part and the inner dot joint parts in the vicinity of a gas inflow port.

13. The curtain bag according to claim 5, wherein only a surface opposed to a window glass of an automobile is coated with a coating agent.

14. The curtain bag according to claim 5, wherein a surface opposed to a window glass of an automobile and a surface opposed to a compartment are coated in different quantities of coating.

15. The curtain bag according to claim 2, wherein the inner dot joint parts provided in the vicinity of the gas inflow port are arranged in positions, which are in parallel to a direction of gases jetting from the gas generator and in which gases are not prevented from flowing forward.

* * * * *